US006992122B2

(12) United States Patent
Resendes et al.

(10) Patent No.: US 6,992,122 B2
(45) Date of Patent: Jan. 31, 2006

(54) SILICA-FILLED ELASTOMERIC COMPOUNDS

(75) Inventors: Rui Resendes, Sarnia (CA); William Hopkins, Sarnia (CA); John Rausa, Corunna (CA)

(73) Assignee: Bayer Inc., Sarnia (CA)

( * ) Notice: Subject to any disclaimer, the term of this patent is extended or adjusted under 35 U.S.C. 154(b) by 160 days.

(21) Appl. No.: 10/434,863

(22) Filed: May 9, 2003

(65) Prior Publication Data

US 2004/0030028 A1    Feb. 12, 2004

(30) Foreign Application Priority Data

May 13, 2002    (CA)  .................................... 2386098

(51) Int. Cl.
    *C08K 9/00*      (2006.01)
(52) U.S. Cl. .................. 523/209; 524/492; 524/493; 525/332.5; 525/332.6
(58) Field of Classification Search ............... 523/209; 524/492, 493; 525/332.5, 332.6
See application file for complete search history.

(56) References Cited

U.S. PATENT DOCUMENTS

| 3,337,391 | A | * | 8/1967 | Clayton et al. | .............. 428/441 |
| 3,716,513 | A | * | 2/1973 | Burke, Jr. et al. | .......... 523/351 |
| 4,897,446 | A | * | 1/1990 | Aonuma | ...................... 525/64 |
| 5,066,721 | A | * | 11/1991 | Hamada et al. | ............. 525/102 |
| 2002/0156173 | A1 | * | 10/2002 | Hopkins et al. | ........... 524/492 |

FOREIGN PATENT DOCUMENTS

| CA | 2293149 | 6/2001 |
| CA | 2364174 | 11/2001 |
| CA | 2339080 | 9/2002 |
| EP | 1 329 479 | 7/2003 |

* cited by examiner

*Primary Examiner*—Bernard Lipman
(74) *Attorney, Agent, or Firm*—Jennifer R. Seng

(57) ABSTRACT

The present invention relates to silica-filled halogenated butyl elastomers, such as bromobutyl elastomers (BIIR) wherein the silica is surface-functionalized with a protein.

6 Claims, 9 Drawing Sheets

SILICA-FILLED ELASTOMERIC COMPOUNDS

FIELD OF THE INVENTION

The present invention relates to silica-filled halogenated butyl elastomers, such as bromobutyl elastomers (BIIR) wherein the silica is surface-functionalized with a protein.

BACKGROUND OF THE INVENTION

It is known that reinforcing fillers such as carbon black and silica greatly improve the strength and fatigue properties of elastomeric compounds. It is also known that chemical interaction occurs between the elastomer and the filler. For example, good interaction between carbon black and highly unsaturated elastomers such as polybutadiene (BR) and styrene butadiene copolymers (SBR) occurs because of the large number of carbon-carbon double bonds present in these copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 illustrates that it is possible to produce filled butyl elastomer compositions with improved properties by combining halobutyl elastomers with silica and specific silanes. These silanes act as dispersing and bonding agents between the halogenated butyl elastomer and the filler. However, one disadvantage of the use of silanes is the evolution of alcohol during the process of manufacture and potentially during the use of the manufactured article produced by this process. Additionally, silanes significantly increase the cost of the resulting manufactured article.

Co-pending application CA 2,339,080 discloses a process for preparing compositions containing halobutyl elastomers and organic compounds containing at least one basic nitrogen-containing group and at least one hydroxyl group in which there is enhanced interaction between the elastomer and a filler, especially a mineral filler. Of interest were compounds containing primary amine and hydroxyl groups such as ethanolamine. While solving the problem of enhancing the interaction between elastomer and filler, said compositions have to be processed carefully to prevent any undesirable scorch of the composition. Those skilled in the art understand the term scorch as premature crosslinking of the composition during processing.

Co-pending Canadian Patent Application CA-2,412,709 discloses a process for preparing compositions containing halobutyl elastomers, organic compounds containing at least one basic nitrogen-containing group and at least one hydroxyl group, and hydrated metal halogenides. In this process there is enhanced interaction between the elastomer and a filler, especially a mineral filler with improved scorch safety. The application also discloses filled halobutyl elastomer compositions containing halobutyl elastomers, organic compounds containing at least one basic nitrogen-containing group and at least one hydroxyl group, and one or more hydrated metal halogenides. Those compositions have improved properties when compared to known carbon black-filled halobutyl elastomeric compositions combined with an enhanced scorch safety.

SUMMARY OF THE INVENTION

The present invention provides a process for preparing compositions containing halobutyl elastomers and mineral fillers including the step of admixing at least one halobutyl elastomer with at least one mineral filler wherein the surface of said mineral fillers has been modified with at least one organic compound containing at least one basic nitrogen-containing group and at least one hydroxyl group. The process provides an enhanced level of dispersability between the elastomer and the modified mineral filler, especially a silica mineral filler. The present invention also provides filled, metal halogenide free, halobutyl elastomer compositions containing halobutyl elastomers and mineral fillers wherein the surface of said mineral fillers has been modified with organic compounds containing at least one basic nitrogen-containing group and at least one hydroxyl group. These compositions have improved properties when compared to known mineral filler-filled halobutyl elastomeric compositions combined with an enhanced homogeneity and a higher degree of reinforcement.

Preferably the surface of the mineral fillers has been modified with organic compounds containing at least one amine and acid group such as proteins. These organic compounds are believed to disperse and bond the mineral-filler effectively to the halogenated elastomers.

Accordingly, in a further aspect the present invention provides a process which comprises mixing a halobutyl elastomer with at least one mineral filler wherein the surface of said mineral filler has been modified with organic compounds containing at least one basic nitrogen-containing group and at least one hydroxyl group, and curing the resulting filled halobutyl elastomer. The resulting composition, having homogeneity and a higher degree of reinforcement, forms another aspect of the present invention.

The mineral-filled halobutyl elastomer of the present invention can be admixed with other elastomers or elastomeric compounds before it is subjected to curing.

DETAILED DESCRIPTION OF THE INVENTION

Figure 1:
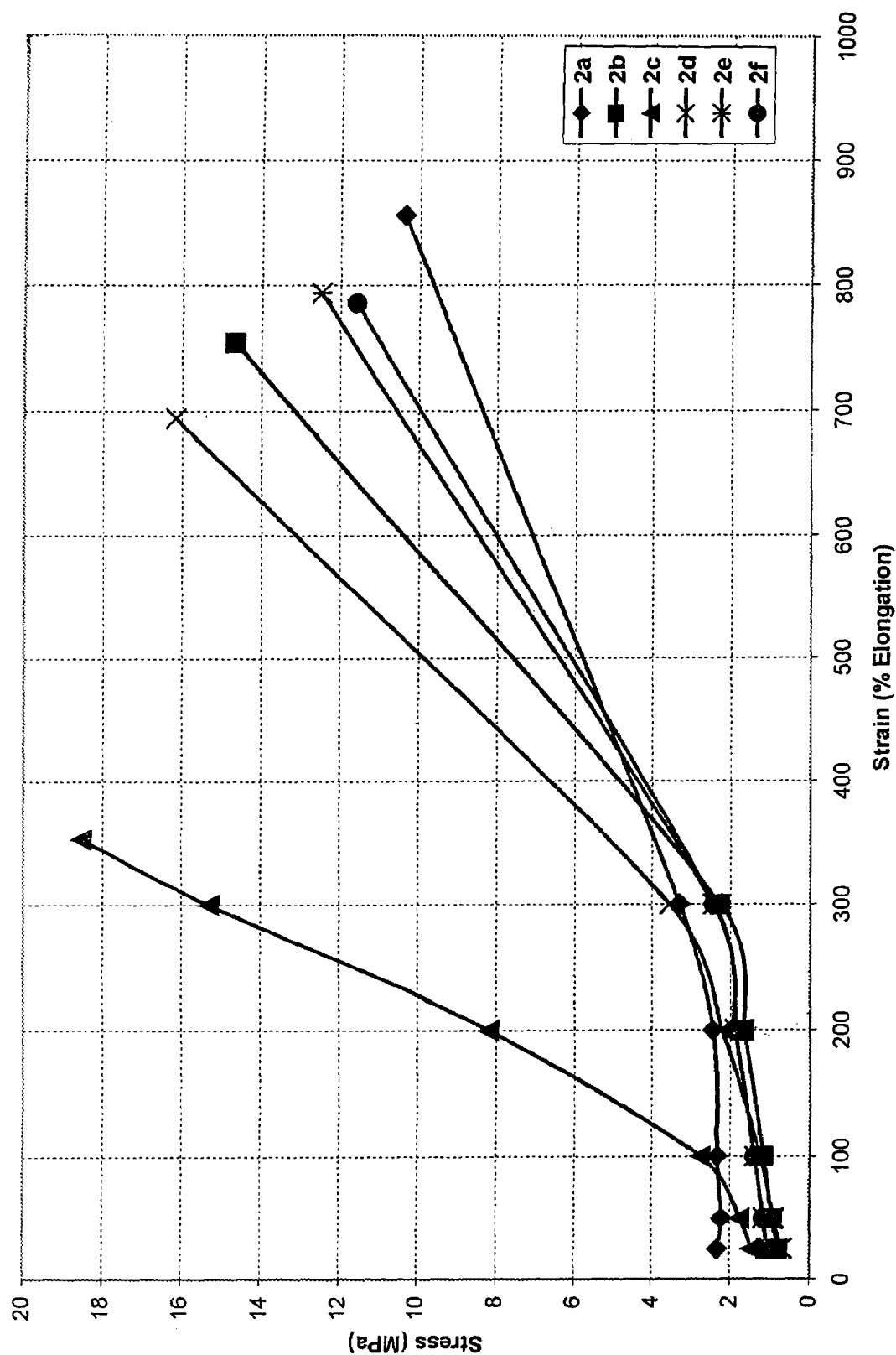
FIG. 1 illustrates an improvement in reinforcement for compounds that contain protein-modified silica (HSPC 100).

The phrase "halobutyl elastomer(s)" as used herein refers to a chlorinated and/or brominated butyl elastomer. Brominated butyl elastomers are preferred, and the present invention is illustrated, by way of example, with reference to such bromobutyl elastomers. It should be understood, however, that the present invention extends to the use of chlorinated butyl elastomers.

Thus, halobutyl elastomers suitable for use in the practice of the present invention include, but are not limited to, brominated butyl elastomers. Such elastomers may be obtained by bromination of butyl rubber (which is a copolymer having repeating units derived form at least one isoolefin, such as isobutylene and at least one co-monomer that is usually a $C_4$ to $C_6$ conjugated diolefin, preferably isoprene). Co-monomers other than conjugated diolefins can be used, however, and mention is made of alkyl-substituted vinyl aromatic co-monomers such as $C_1$- to $C_4$-alkyl substituted styrene. An example of such an elastomer which is commercially available is brominated isobutylene methylstyrene copolymer (BIMS) in which the co-monomer is p-methylstyrene.

Brominated butyl elastomer typically contain in the range of from 1 to 3 weight percent of repeating units derived from a diolefin, preferably isoprene and in the range of from 97 to 99 weight percent of repeating units derived from an isoolefin, preferably isobutylene, (based upon the hydrocarbon content of the polymer) and in the range of from 1 to 4 weight percent bromine (based upon the bromobutyl polymer). A typical bromobutyl polymer has a molecular weight, expressed as the Mooney viscosity (ML 1+8 at 125° C.), of in the range of from 28 to 55.

For use in the present invention the brominated butyl elastomer preferably contains in the range of from 1 to 5 weight percent of repeating units derived from a diolefin, such as isoprene and from 95 to 99 weight percent of repeating units derived from an isoolefin, such isobutylene (based upon the hydrocarbon content of the polymer) and from 0.5 to 2.5 weight percent, preferably from 0.75 to 2.3 weight percent, of bromine (based upon the brominated butyl polymer).

A stabilizer may be added to the brominated butyl elastomer. Suitable stabilizers include calcium stearate and epoxidized soybean oil, preferably used in an amount in the range of from 0.5 to 5 parts by weight per 100 parts by weight of the brominated butyl rubber.

Examples of suitable brominated butyl elastomers include Bayer® Bromobutyl 2030™, Bayer® Bromobutyl 2040™ (BB2040), and Bayer® Bromobutyl X2™ commercially available from Bayer Inc. Bayer® BB2040 has a Mooney viscosity (RPML 1+8 @ 125° C. according to ASTM D 52-89) of 39±4, a bromine content of 2.0±0.3 wt. % and an approximate molecular weight Mw of 500,000 grams per mole.

The brominated butyl elastomer used in the process of this invention may also be a graft copolymer of a brominated butyl rubber and a polymer based upon a conjugated diolefin monomer. Co-pending Canadian Patent Application 2,279,085, published on Jan. 29, 2001 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The bromobutyl elastomer of the graft copolymer can be any of those described above. The conjugated diolefins that can be incorporated in the graft copolymer generally have the structural formula:

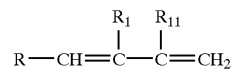

wherein R is a hydrogen atom or an alkyl group containing in the range of from 1 to 8 carbon atoms and wherein $R_1$ and $R_{11}$ can be the same or different and are selected from the group consisting of hydrogen atoms and alkyl groups containing in the range of from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing in the range of from 4 to 8 carbon atoms are preferred, 1,3-butadiene and isoprene being preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, are selected so as to be copolymerizable with the conjugated diolefin monomers being employed. Generally, any vinyl aromatic monomer, which is known to polymerize with organo-alkali metal initiators, can be used. Such vinyl aromatic monomers usually contain in the range of from 8 to 20 carbon atoms, preferably in the range of from 8 to 14 carbon atoms. Some examples of vinyl aromatic monomers which can be so copolymerized include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene. It is apparent to the skilled in the art that the given ranges for isoolefin and diolefin will have to be adjusted to result in a total of 100%.

The filler is composed of particles of a mineral, and examples include silica, silicates, clay (such as bentonite), gypsum, alumina, aluminum oxide, magnesium oxide, calcium oxide, titanium dioxide, talc and the like, as well as mixtures thereof. These mineral particles have hydroxyl groups on their surface, rendering them hydrophilic and oleophobic. This exacerbates the difficulty of dispersing them homogeneous and of achieving good interaction between the filler particles and the butyl elastomer. For many purposes, the preferred mineral is silica, especially silica prepared by the carbon dioxide precipitation of sodium silicate.

Dried amorphous silica particles suitable for use in accordance with the present invention have a mean agglomerate particle size in the range of from 1 to 100 microns, preferably in the range of from 10 to 50 microns and most preferably from 10 to 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of in the range of from 50 to 450 square meters per gram and a DBP absorption, as measured in accordance with DIN 53601, of in the range of from 150 to 400 grams per 100 grams of silica, and a drying loss, as measured according to DIN ISO 787/1 1, of in the range of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG.

Carbon black is not normally used as a filler in the halobutyl elastomer compositions of the present invention, but in some embodiments it may be present in an amount up to 40 phr. If the mineral filler is silica and it is used with carbon black, the silica should constitute at least 55% by weight of the total of silica and carbon black. If the halobutyl elastomer composition of the present invention is blended with another elastomeric composition, that other composition may contain carbon black as a filler.

The amount of filler to be incorporated into the halobutyl elastomer can vary between wide limits. Typical amounts of filler range from 20 parts to 120 parts by weight, preferably from 30 parts to 100 parts, more preferably from 40 to 80 parts per hundred parts of elastomer.

The organic compound which is used to modify the surface of the mineral filler has at least one hydroxyl group and at least one basic nitrogen-containing group contains at least one hydroxyl group, which (without being bound to any particular theory) may react with the mineral filler, and at least one group containing a basic nitrogen atom, which (without being similarly bound) may react with the active halogen in a halogenated butyl elastomer (for example with the active bromine atom in a brominated butyl elastomer). Functional groups containing —OH may be, for example, alcohols or carboxylic acids. Functional groups containing a basic nitrogen atom include, but are not limited to, amines, preferably primary and secondary amines, and amides.

Examples of organic compounds which have at least one hydroxyl group and at least one basic nitrogen-containing group which give enhanced physical properties to mixtures of halobutyl elastomers and especially silica include proteins, aspartic acid, 6-aminocaproic acid, diethanolamine and triethanolamine. Preferably, the additive is a protein, which may be linear or branched.

More preferably, the protein is a soy protein, which might be modified in a known manner. Examples of preferred soy proteins include proteins of the ProCote family, such as ProCote 5000, available from Protein Technologies International, USA.

The amount of the organic compound, which has at least one hydroxyl group and at least one basic nitrogen-containing group used, is dependent upon the molecular/equivalent weight of each specific compound. One important factor is the number/weight of nitrogen per unit weight of the compound. The level of nitrogen may range from 0.1 to 5 parts per hundred (phr) of halobutyl rubber, preferably from 0.125 to 1 phr and, more preferably, from 0.3 to 0.7 phr. Up to 40 parts of processing oil, preferably from 5 to 20 parts, per hundred parts of elastomer, may be present. Further, a lubricant, for example a fatty acid such as stearic acid, may be present in an amount up to 3 parts by weight, more preferably in an amount up to 2 parts by weight.

The surface-modification of the mineral filler can be effected in many ways. One way may be to mix the organic compound containing at least one basic nitrogen-containing group and at least one hydroxyl group with a low-boiling organic solvent, such as acetone, add a water/alcohol mixture, e.g. water/glycerol mixture, to the resulting slurry of the organic compound and low-boiling organic solvent, add the resulting dispersion to a suspension of mineral filler in water under vigorous agitation, stir the mixture for several minutes up to several hours, evaporate the low-boiling organic solvent and dry the surface-modified mineral filler in a vacuum oven at a temperature that would not destroy the organic compound containing at least one basic nitrogen-containing group and at least one hydroxyl group.

The halobutyl elastomer that is admixed with at least one mineral filler wherein the surface of said mineral filler has been modified with organic compounds containing at least one basic nitrogen-containing group and at least one hydroxyl group may be a mixture with another elastomer or elastomeric compound. The halobutyl elastomer should constitute more than 5% of any such mixture. Preferably the halobutyl elastomer should constitute at least 10% of any such mixture. In some cases it is preferred not to use mixtures but to use the halobutyl elastomer as the sole elastomer. If mixtures are to be used, however, then the other elastomer may be, for example, natural rubber, polybutadiene, styrene-butadiene or poly-chloroprene or an elastomer compound containing one or more of these elastomers.

The filled halobutyl elastomer can be cured to obtain a product, which has improved properties, for instance in abrasion resistance, rolling resistance and traction. Curing can be effected with sulfur. The preferred amount of sulfur is in the range of form 0.3 to 2.0 parts by weight per hundred parts of rubber. An activator, for example zinc oxide, may also be used, in an amount of from 5 parts to 2 parts by weight. Other ingredients, for instance stearic acid, antioxidants, or accelerators may also be added to the elastomer prior to curing. Sulphur curing is then effected in known manner. See, for instance, chapter 2, "The Compounding and Vulcanization of Rubber", of "Rubber Technology", $3^{rd}$ edition, published by Chapman & Hall, 1995.

Other curatives known to cure halobutyl elastomers may also be used. A number of compounds are known to cure BIIR, for example, such as bis dieneophiles (for example HVA2=m-phenylene-bis-maleimide) phenolic resins, amines, amino acids, peroxides, zinc oxide and the like. Combinations of the aforementioned curatives may also be used.

The halobutyl elastomer, surface-modified mineral filler and optionally additives are mixed together, suitably at a temperature in the range of from 25 to 200° C. It is preferred that the temperature in one of the mixing stages be greater than 60° C., and a temperature in the range of from 90 to 150° C. is more preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

The order of addition of the different components to the rubber is not critical.

The enhanced level of dispersion and also better interaction between the filler and the halobutyl elastomer results in improved properties for the filled elastomer as well as favorable shorter mixing times. The improved properties include higher tensile strength, higher abrasion resistance, lower permeability and better dynamic properties. These render the filled elastomers particularly suitable for a number of applications, including, but not limited to, use in tire treads and tire sidewalls, tire innerliners, tank linings, hoses, rollers, conveyor belts, curing bladders, gas masks, pharmaceutical enclosures and gaskets. These advantages are achieved together with an enhancement in reinforcement.

According to the present invention, bromobutyl elastomer, protein-coated mineral filler particles and, optionally, processing oil extender can be mixed on a two-roll mill at a nominal mill temperature of 25° C. The mixed compound is then placed on a two-roll mill and mixed at a temperature above 60° C. It is preferred that the temperature of the mixing does not exceed 150° C., since higher temperatures may cause curing to proceed undesirably far and thus impede subsequent processing. The product of mixing these ingredients, preferably at a temperature not exceeding 150° C., is a compound which has good stress/strain properties and which can be readily processed further on a warm mill with the addition of curatives.

The filled halobutyl rubber compositions of the present invention, such as filled bromobutyl rubber compositions, find many uses, including use in tire tread compositions. Important features of a tire tread composition are that it shall have low rolling resistance, good traction, particularly in the wet, and good abrasion resistance so that it is resistant to wear. Compositions of the present invention display improved resistance to wear when compared to compounds, which contain no organic modifier or hydrated metal halogenide while possessing improved scorch safety. As is demonstrated in the examples below, compositions of the invention display improved resistance to wear with enhanced scorch safety. Therefore, filled, cured, shaped articles containing at least one halobutyl elastomer and at least one mineral filler wherein the surface of said mineral filler has been modified with organic compounds containing at least one basic nitrogen-containing group and at least one hydroxyl group obtainable by curing the filled halobutyl rubber compositions of the present invention form another aspect of the invention.

The filled halobutyl elastomers of this present invention can be further mixed with other rubbers, for example natural rubber, butadiene rubber, styrene-butadiene rubber and isoprene rubbers, and compounds contain these elastomers.

The present invention is further illustrated in the following examples and the accompanying Figures.

EXAMPLES

Description of Tests:
Abrasion resistance: DIN 53-516 (60 grit Emery paper)
Cure rheometry: ASTM D 52-89 MDR2000E Rheometer at 1°arc and 1.7 Hz Dynamic Property Testing:
Dynamic testing (tan δ at 0° C. and 60° C., Loss modulus at 60° C.) were carried out using the GABO. The GABO is a dynamic mechanical analyzer for characterizing the properties of vulcanized elastomeric materials. The dynamic mechanical properties give a measure of traction with the best traction usually obtained with high values of tan δ at 0° C. Low values of tan δ at 60° C., and in particular, low loss moduli at 60° C. are indicators of low rolling resistance. RPA measurements were obtained with the use of an Alpha Technologies RPA 2000 operating at 100° C. at a frequency of 6 cpm. Strain sweeps were measured at strains of 0.1, 0.2, 0.5, 1, 2, 5, 10, 20, 50 and 90°.

Compound Mooney Scorch. Measurements were conducted at 135° C. using a small rotor. The t03 value obtained with the small rotor is equivalent to the t05 value (large rotor) typically quoted.

Stress-strain. Samples were prepared by curing a macro sheet at 170° C. for tc90+5 minutes, after which the appropriate sample was dyed out. The test was conducted at 23° C.

Description of Ingredients and General Mixing Procedure:
Hi-Sil® 233—silica—a product of PPG
Sunpar® 2280—paraffinic oil produced by Sun Oil.
Maglite® D—magnesium oxide by C. P. Hall
N,N-dimethylaminoethanol (DMAE) by Aldrich Chemical Co.
ProCote 5000 (PC5000) by Protein Technologies International, USA The brominated butyl elastomer Bayer® BB2030, protein-modified silica and oil were mixed in a 1.57 liter Banbury internal tangential mixture with the Mokon set to 40° C. and a rotor speed of 77 RPM. The total mixing time was 6 minutes. Curatives were then added to the cooled sample with a 6"×12" mill at 25° C.

Example 1

The following details the preparation of protein-modified silica, HSPC100.

66 g of ProCote 5000 were added to 600 mL of Acetone with rapid agitation. 600 mL of de-ionized water followed by 150 mL of glycerol were added to the ProCote 5000/Acetone slurry. After 0.5 hrs of agitation, this dispersion was added to a suspension of 500 g of HiSil® 233 in 3000 mL of water with vigorous agitation. The agitation level must allow for the maintenance of a stable heterogeneous suspension throughout the derivatization. The mixture was stirred for 24 hrs to ensure complete derivatization of the HiSil® 233 and evaporation of the acetone before the functionalized silica was dried in a conventional vacuum oven at 50° C.

Example 2

The effect of protein-modified silica, HSPC100, on the degree of reinforcement (as denoted by the M300/M100 values), degree of silica dispersion (G* at low strains), DIN abrasion resistance and scorch safety (as denoted by the t03 times in minutes) in compounds containing brominated butyl rubber, Maglite® D and optionally DMEA was studied. Compounds containing conventional HiSil® 233 and protein (PC5000), with glycerol and water, was used as a thru control. All of the compounds studied utilized a mixture of 0.5 phr of sulfur, 1.5 phr of zinc oxide and 1.0 phr of stearic acid as the curative system.

Brominated isoprene isobutylene rubber (BIIR) Bayer® BB2030 was mixed with 60 parts per hundred rubber (phr) of protein-modified silica filler (HSPC100) in a Banbury internal mixer under the mixing conditions described above. For the control, regular HiSil® 233 and PC5000 with glycerol and water, were used instead of the surface-modified HSPC100. Identical curative ingredients (1 phr of stearic acid, 0.5 phr of sulfur, and 1.5 phr of ZnO) were then added on a cool mill to each of the compounds. The compounds were then cured for either $t_{c(90)}+10$ minutes at 170° C. (for DIN Abrasion testing) or $t_{c(90)}+5$ minutes at 170° C. and tested. Table 1 gives the product compositions in parts by weight.

TABLE 1

| Example | 2a | 2b | 2c | 2d | 2e | 2f |
|---|---|---|---|---|---|---|
| BB2030 | 100 | 100 | 100 | 100 | 100 | 100 |
| HI SIL 233 | 60 | | 60 | | 60 | 60 |
| MAGLITE D | 1 | 1 | 1 | 1 | 1 | 1 |
| N,N-dimethylaminoethanol | | | 1.6 | 1.6 | | |
| Procote 5000 | | | | | 12 | 16 |
| Glycerol | | | | | 4.8 | 6.4 |
| Water | | | | | 30 | 40 |
| HSPC100 | | 60 | | 60 | | |
| Curatives | | | | | | |
| Sulfur | 0.5 | 0.5 | 0.5 | 0.5 | 0.5 | 0.5 |
| Zinc Oxide | 1.5 | 1.5 | 1.5 | 1.5 | 1.5 | 1.5 |
| Stearic Acid | 1 | 1 | 1 | 1 | 1 | 1 |

Table 2 lists the analytical data for the compounds 2a–2f

TABLE 2

| | | | | | | |
|---|---|---|---|---|---|---|
| Ultimate Tensile (MPa) | 10.37 | 14.68 | 18.52 | 16.15 | 12.49 | 11.59 |
| Ultimate Elongation (%) | 856 | 755 | 353 | 694 | 794 | 786 |
| M300/M100 | 1.42 | 1.95 | 5.56 | 2.87 | 1.77 | 1.75 |
| DIN ABRASION | | | | | | |
| Abrasion Volume Loss (mm$^3$) | 286 | 530 | 216 | 520 | 361 | 341 |
| COMPOUND MOONEY SCORCH | | | | | | |
| t Value t03 (min) | 8.02 | 11.53 | 4.13 | 2.69 | 3.27 | 2.65 |
| MDR CURE CHARACTERISTICS | | | | | | |
| MH (dN · m) | 31.14 | 22.58 | 34.36 | 18.12 | 19.8 | 17.93 |
| ML (dN · m) | 17.78 | 4.95 | 13.84 | 4.5 | 6.73 | 6.19 |
| RPA Payne Effect (G*, kPa) | | | | | | |
| 0.28 | 2939.3 | 325.15 | 1201.6 | 229.29 | 1066.4 | 1088 |
| 0.98 | 3924.9 | 446.26 | 1252.3 | 248.79 | 1156.8 | 1135.2 |
| Strain | G* | G* | G* | G* | G* | G* |
| Tan δ | | | | | | |
| 0 deg C | 0.237 | 0.706 | 0.558 | 0.794 | 0.464 | 0.436 |
| 60 deg C | 0.108 | 0.166 | 0.097 | 0.123 | 0.212 | 0.236 |

As can be seen from Table 2 and FIG. 1, a marked improvement in reinforcement is observed for compounds in which HSPC100 is used in place of regular HiSil® 233. Importantly, the degree of reinforcement is superior to that seen for compounds which utilize unmodified HiSil® 233 with ProCote 5000, water and glycerol.

Figure 2:
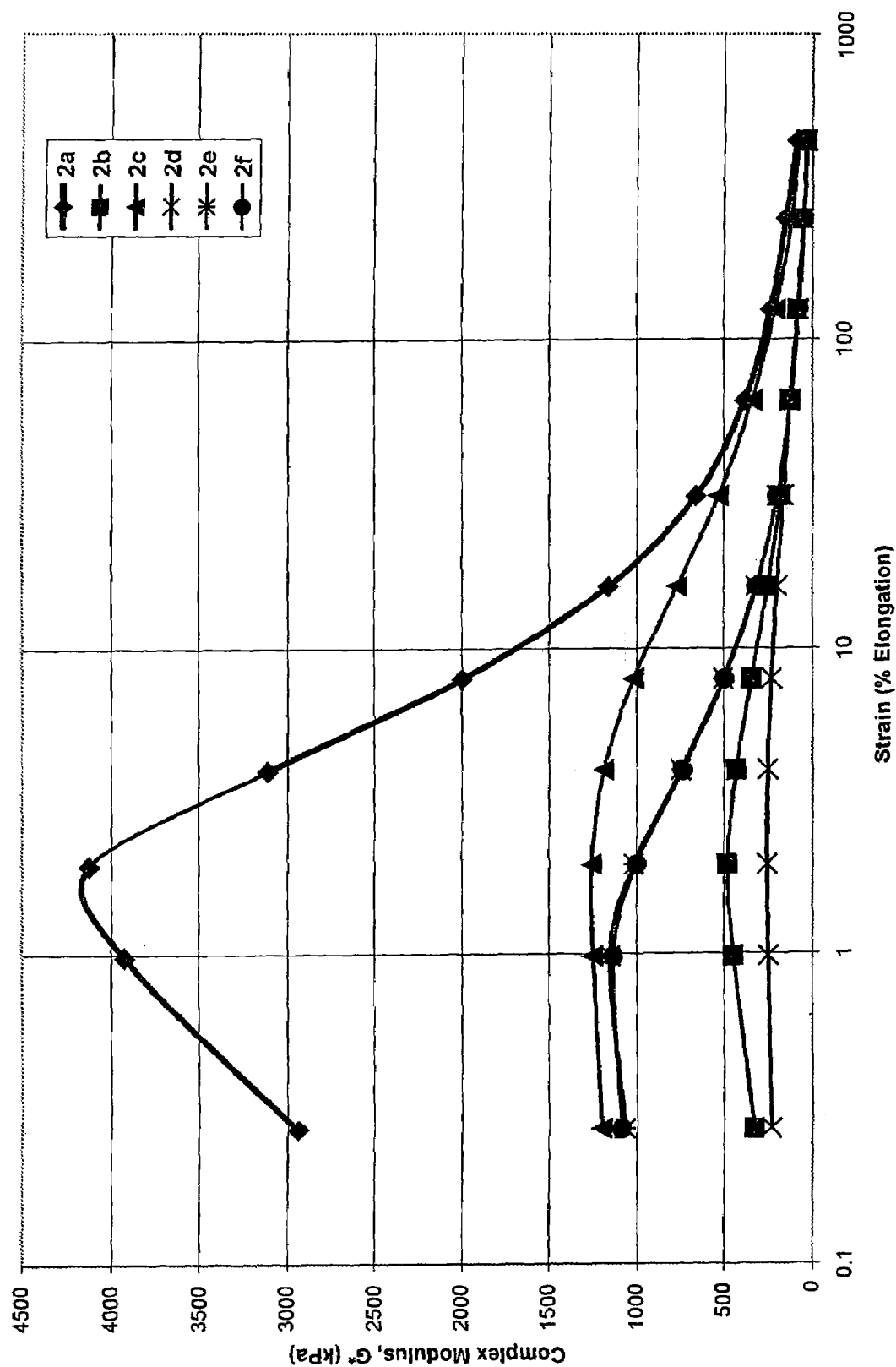
FIG. 2 illustrates an improved compatibility between protein-modified silica (HSPC 100) and bromobutyl rubber.

The improved compatibility between HSPC100 and BB2030 is evident from FIG. 2. Typically, low values of the complex modulus, G*, at low strains (ca. 0.28%) is indicative of good filler dispersion. Therefore, the lower the G* value, the less filler agglomeration/aggregation and thus the better the filler dispersion. The data presented in Table 2 and FIG. 2 clearly shows that compounds which utilize HSPC100 in place of HiSil® 233 display enhanced levels of filler dispersion.

Figure 3:
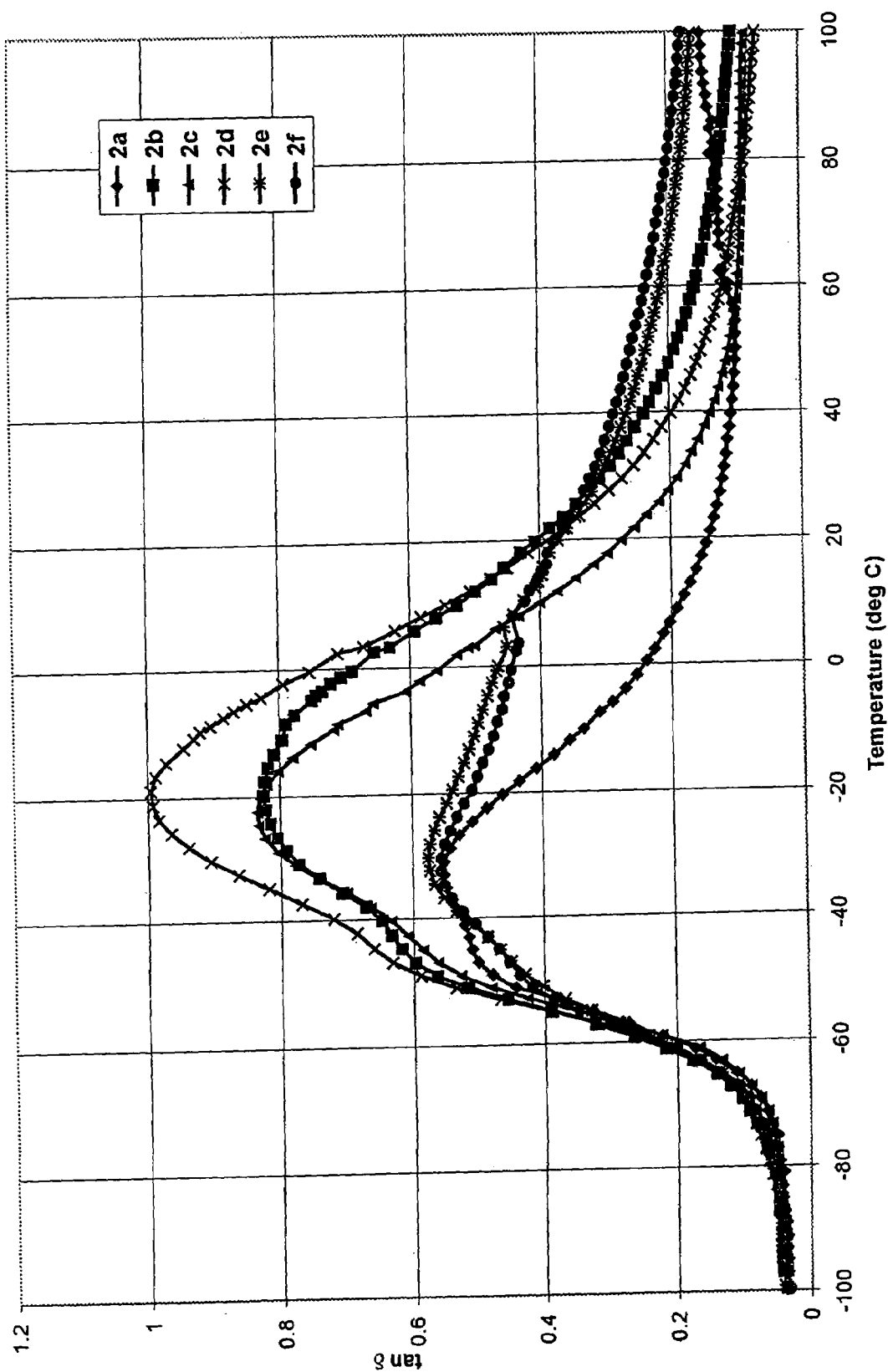
FIG. 3 illustrates the improved dynamic properties of vulcanizates containing protein-modified silica (HSPC 100).

Utilization of HSPC100 also improves the dynamic properties of the resulting vulcanizate as can be seen from Table 2 and FIG. 3. Importantly, the tan □ value at 0° C. for the compound that utilizes HSPC100 is much greater than that observed for the corresponding compound incorporating HiSil® 233 as the reinforcing filler. This observation is again consistent with an enhanced level of interaction between the filler and the elastomeric continuous phase.

The data presented in Table 2 and FIGS. 1–3 also serve to illustrate the advantage of pre-functionalizing HiSil® 233. Specifically, the physical properties obtained for compounds which incorporate HiSil® 233, ProCote 5000, water and glycerol (added together in an internal Banbury mixer) were found to be inferior to those possessed by compounds which utilized HSPC100.

Example 3

The following details the preparation of protein-modified silica, HSPC050.

33 g of ProCote 5000 were added to 300 mL of Acetone with rapid agitation. 300 mL of de-ionized water followed by 75 mL of glycerol were added to the ProCote 5000/Acetone slurry. After 0.5 hrs of agitation, this dispersion was added to a suspension of 500 g of HiSil® 233 in 3000 mL of water with vigorous agitation. The agitation level must be sufficiently high to allow for the maintenance of a stable heterogeneous suspension throughout the duration of the derivatization experiment. The mixture was stirred for 24 hrs to ensure complete derivatization of the HiSil® 233 and evaporation of the acetone before the functionalized silica was dried in a conventional vacuum oven at 50° C.

Example 4

The effect of protein-modified silica, HSPC050, on the degree of reinforcement (as denoted by the M300/M100 values), degree of silica dispersion, DIN abrasion resistance and scorch safety (as denoted by the $t_{03}$ times in minutes) in compounds containing brominated butyl rubber, Maglite® D and optionally DMEA was studied. A compound containing conventional HiSil® 233 was used as a control. All of the compounds studied utilized a mixture of 0.5 phr of sulfur, 1.5 phr of zinc oxide and 1.0 phr of stearic acid as the curative system.

Brominated isoprene isobutylene rubber (BIIR) Bayer BB2030 was mixed with 60 parts per hundred rubber (phr) of protein-modified silica filler (HSPC050) in a Banbury internal mixer under the mixing conditions described above. For the control, regular HiSil® 233 was used instead of the surface-modified HSPC050. Identical curative ingredients (1 phr of stearic acid, 0.5 phr of sulfur, and 1.5 phr of ZnO) were then added on a cool mill to each of the compounds. The compounds were then cured for either $t_{c(90)}$+10 minutes at 170° C. (for DIN Abrasion testing) or $t_{c(90)}$+5 minutes at 170° C. and tested. Table 3 gives the product compositions in parts by weight.

TABLE 3

| Example | 4a | 4b | 4c | 4d |
|---|---|---|---|---|
| BB2030 | 100 | 100 | 100 | 100 |
| HI SIL 233 | 60 | | 60 | |
| MAGLITE D | 1 | 1 | 1 | 1 |
| N,N-dimethylaminoethanol | | | 1.6 | 1.6 |
| HSPC050 | | 60 | | 60 |
| Curatives | | | | |
| Sulfur | 0.5 | 0.5 | 0.5 | 0.5 |
| Zinc Oxide | 1.5 | 1.5 | 1.5 | 1.5 |
| Stearic Acid | 1 | 1 | 1 | 1 |

Table 4 shows analytical results of Compounds 4a–d.

TABLE 4

| Example | 4a | 4b | 4c | 4d |
|---|---|---|---|---|
| STRESS STRAIN (DUMBELLS) | | | | |
| Hard. Shore A2 Inst. (pts.) | 84 | 62 | 54 | 55 |
| Ultimate Tensile (MPa) | 10.37 | 16.16 | 19.03 | 19.74 |
| Ultimate Elongation (%) | 856 | 683 | 404 | 644 |
| M300/M100 | 1.42 | 2.83 | 6.06 | 4.07 |
| DIN ABRASION | | | | |
| Abrasion Volume Loss (mm³) | 286 | 331 | 267 | 317 |
| COMPOUND MOONEY SCORCH | | | | |
| tValue t03 (min) | 8.02 | 9.88 | 10.41 | 4.79 |
| MDR CURE CHARACTERISTICS | | | | |
| MH (dN · m) | 31.14 | 30.31 | 22.54 | 23.29 |
| ML (dN · m) | 17.78 | 7.42 | 7.02 | 5.75 |
| RPA Payne Effect (G*, kPa) | | | | |
| 0.28 | 2939.3 | 828.24 | 249.38 | 364.12 |
| 0.98 | 3924.9 | 1012.2 | 281.31 | 378.16 |
| Strain | G* | G* | G* | G* |
| Tan δ | | | | |
| 0 deg C | 0.2372 | 0.6468 | 0.7961 | 0.7599 |
| 60 deg C | 0.1084 | 0.1879 | 0.1065 | 0.1195 |

Figure 4:
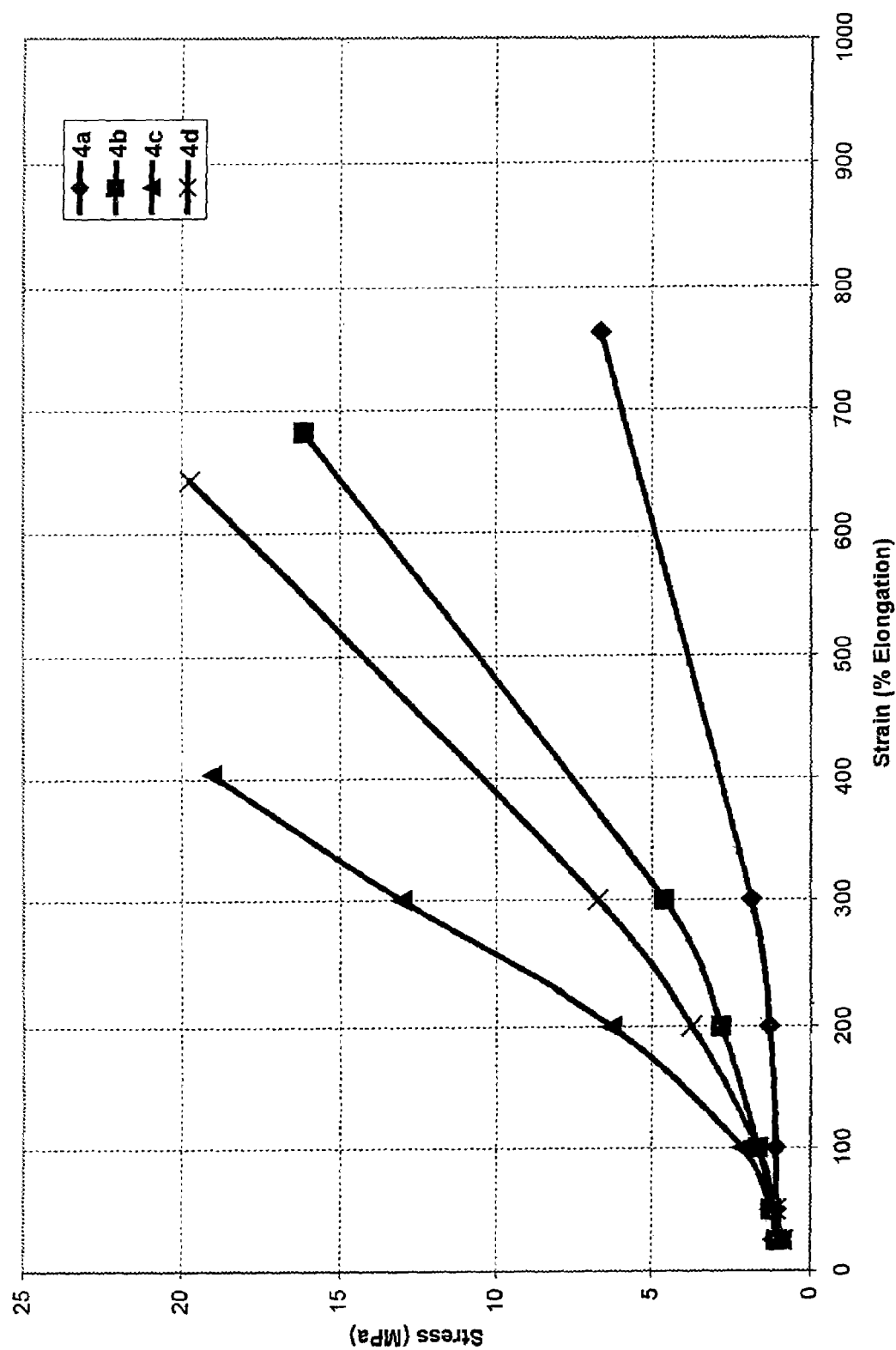
FIG. 4 illustrates an improvement in reinforcement for compounds that contain protein-modified silica (HSPC 50).
Figure 5:
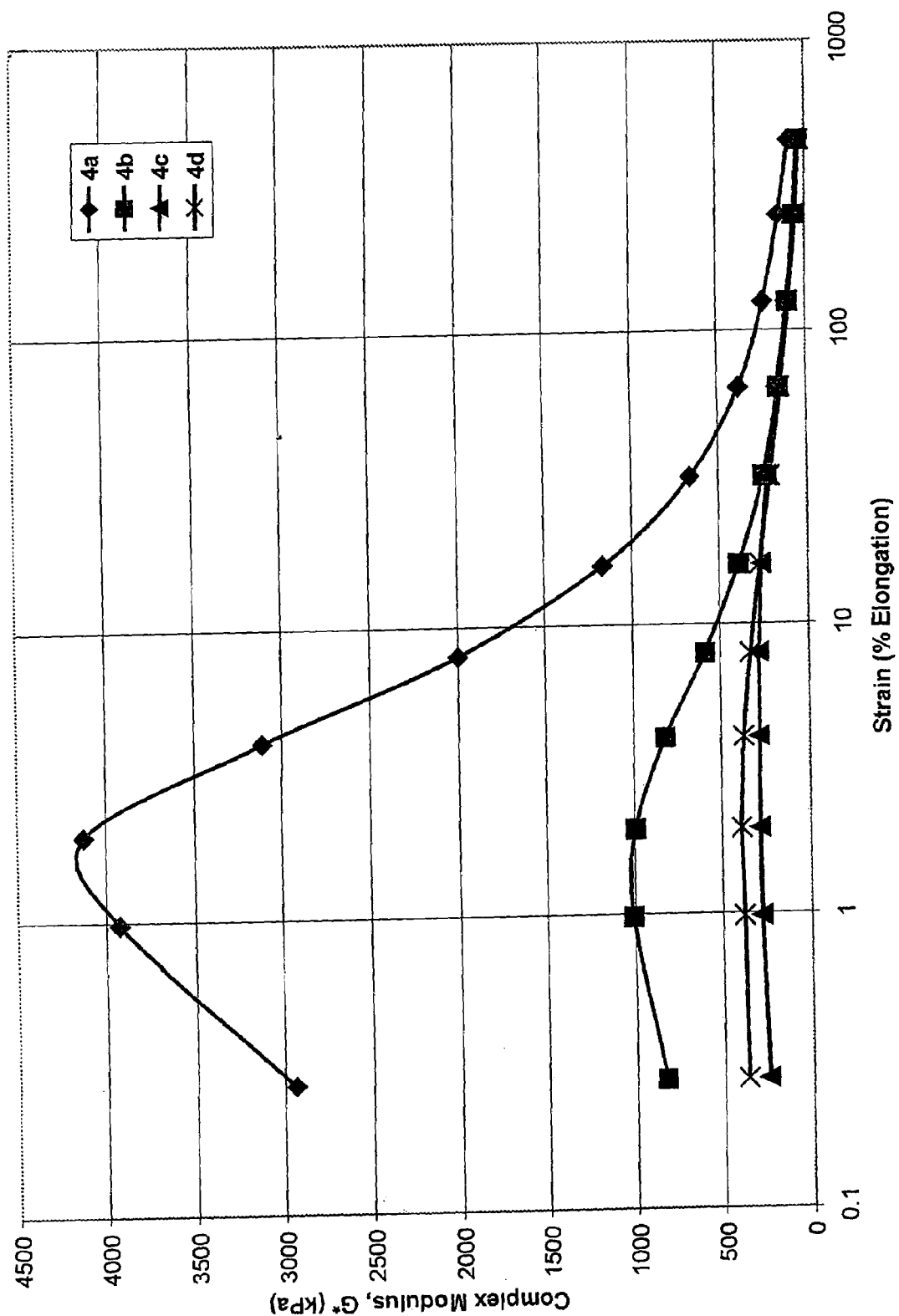
FIG. 5 illustrates an improved compatibility between protein-modified silica (HSPC 50) and bromobutyl rubber.
Figure 6:
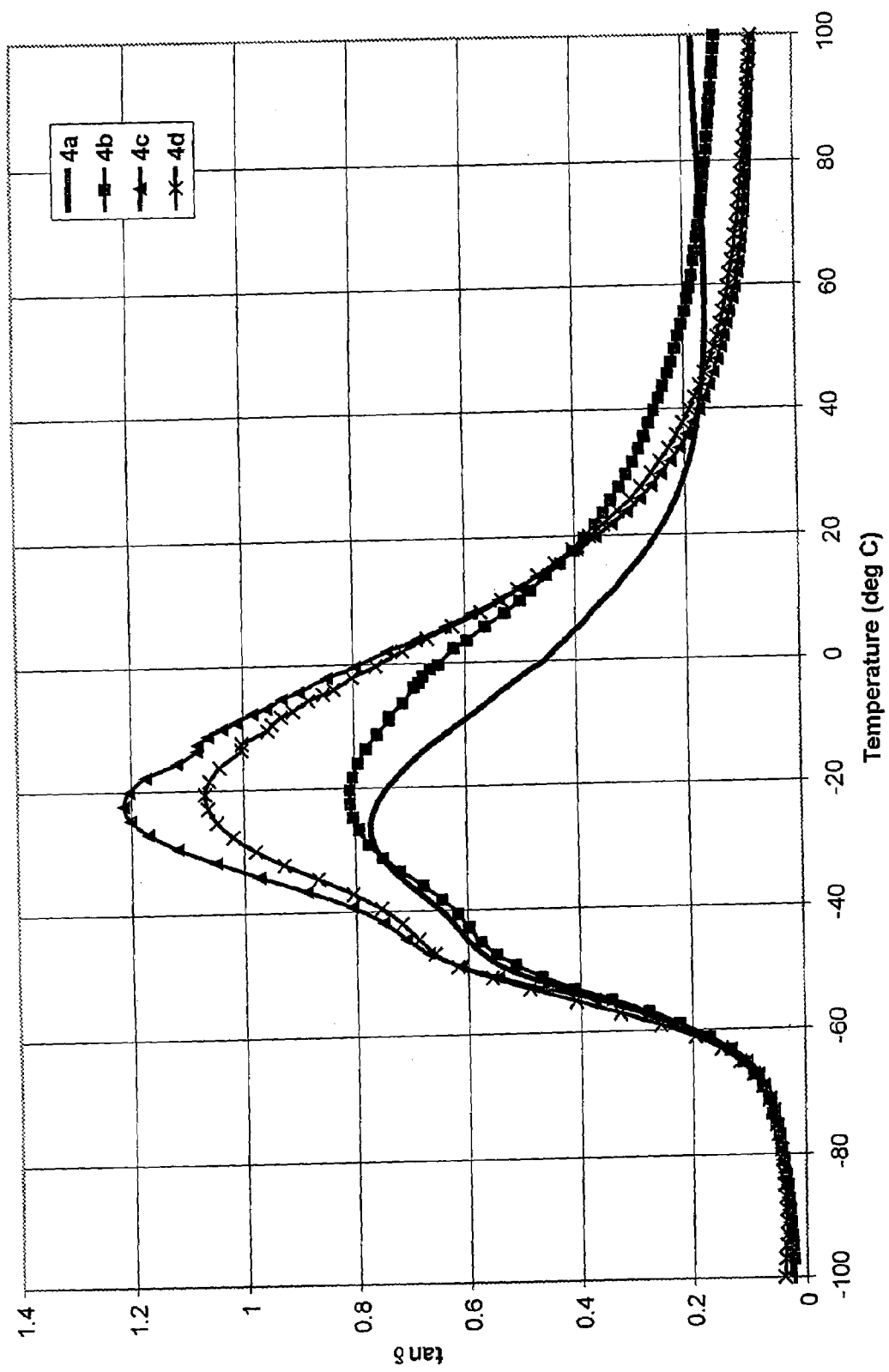
FIG. 6 illustrates the improved dynamic properties of vulcanizates containing protein-modified silica (HSPC 50).

As can be seen from the data presented in Table 4 and FIGS. 4–6, the use of HSPC050 in place of HiSil® 233 imparts improved physical and dynamic properties to the final vulcanizate. Importantly, the presence of less ProCote 5000 in HSPC050, compared to HSPC100, imparts improved levels of reinforcement (M300/M100) and reduced abrasion volume losses (See Table 4). This observation suggests that there exists an optimal level ProCote 5000 which while allowing sufficient surface modification would not impart a detrimental plasticizing effect to the final vulcanizate.

Example 5

The following details the preparation of protein-modified silica, HSPC025.

16.5 g of ProCote 5000 were added to 150 mL of Acetone with rapid agitation. 150 mL of de-ionized water followed by 37.5 mL of glycerol were added to the ProCote 5000/Acetone slurry. After 0.5 hrs of agitation, this dispersion was added to a suspension of 500 g of HiSil® 233 in 3000 mL of water with vigorous agitation. The agitation level must be sufficiently high to allow for the maintenance of a stable heterogeneous suspension throughout the duration of the derivatization experiment. The mixture was stirred for 24 hrs to ensure complete derivatization of the HiSil® 233 and evaporation of the acetone before the functionalized silica was dried in a conventional vacuum oven at 50° C.

Example 6

Given the trends observed on going from HSPC100 to HSPC050 (ca. 50% of ProCote 5000 present in HSPC050 versus HSPC100), the reinforcing effect of HSPC025 (utilizing ca. 25% of the ProCote 5000 used in generating HSPC100) was studied. Specifically, The effect of protein-modified silica, HSPC025, on the degree of reinforcement (as denoted by the M300/M100 values), degree of silica dispersion, DIN abrasion resistance and scorch safety (as denoted by the $t_{03}$ times in minutes) in compounds containing brominated butyl rubber, Maglite® D and optionally DMEA was studied. A compound containing conventional HiSil® 233 was used as a control. All of the compounds studied utilized a mixture of 0.5 phr of sulfur, 1.5 phr of zinc oxide and 1.0 phr of stearic acid as the curative system.

Brominated isoprene isobutylene rubber (BIIR) Bayer BB2030 was mixed with 60 parts per hundred rubber (phr) of protein-modified silica filler (HSPC025) in a Banbury internal mixer under the mixing conditions described above. For the control, regular HiSil® 233 was used instead of the surface-modified HSPC025. Identical curative ingredients (1 phr of stearic acid, 0.5 phr of sulfur, and 1.5 phr of ZnO) were then added on a cool mill to each of the compounds. The compounds were then cured for either $t_{c(90)}$+10 minutes at 170° C. (for DIN Abrasion testing) or $t_{c(90)}$+5 minutes at 170° C. and tested. Table 5 gives the product compositions in parts by weight.

TABLE 5

| Example | 6a | 6b | 6c | 6d |
|---|---|---|---|---|
| BB2030 | 100 | 100 | 100 | 100 |
| HI SIL 233 | 60 | | 60 | |
| MAGLITE D | 1 | 1 | 1 | 1 |
| N,N-dimethylaminoethanol | | | 1.6 | 1.6 |
| HSPC025 | | 60 | | 60 |
| Curatives | | | | |
| Sulfur | 0.5 | 0.5 | 0.5 | 0.5 |
| Zinc Oxide | 1.5 | 1.5 | 1.5 | 1.5 |
| Stearic Acid | 1 | 1 | 1 | 1 |

Table 6 shows analytical data for the compounds 6a–d.

TABLE 6

| Example | 6a | 6b | 6c | 6d |
|---|---|---|---|---|
| STRESS STRAIN (DUMBELLS) | | | | |
| Hard. Shore A2 Inst. (pts.) | 84 | 66 | 54 | 54 |
| Ultimate Tensile (MPa) | 10.37 | 16.19 | 21.86 | 22.01 |
| Ultimate Elongation (%) | 856 | 511 | 428 | 577 |
| M300/M100 | 1.42 | 4.05 | 7.06 | 5.99 |
| DIN ABRASION | | | | |
| Abrasion Volume Loss (mm³) | 286 | 242 | 230 | 268 |

TABLE 6-continued

| Example | 6a | 6b | 6c | 6d |
|---|---|---|---|---|
| COMPOUND MOONEY SCORCH | | | | |
| t Value t03 (min) | 8.02 | 20.07 | 9.57 | 5.42 |
| MDR CURE CHARACTERISTICS | | | | |
| MH (dN · m) | 31.14 | 29.03 | 22.63 | 22.01 |
| ML (dN · m) | 17.78 | 7.66 | 7.01 | 6.16 |
| RPA Payne Effect (G*, kPa) | | | | |
| 0.28 | 2939.3 | 746.56 | 278.22 | 262.83 |
| 0.98 | 3924.9 | 919.4 | 292.17 | 278.35 |
| Strain | G* | G* | G* | G* |
| Tan δ | | | | |
| 0 deg C | 0.2372 | 0.4871 | 0.8186 | 0.8896 |
| 60 deg C | 0.1084 | 0.2118 | 0.1048 | 0.125 |

Figure 7:
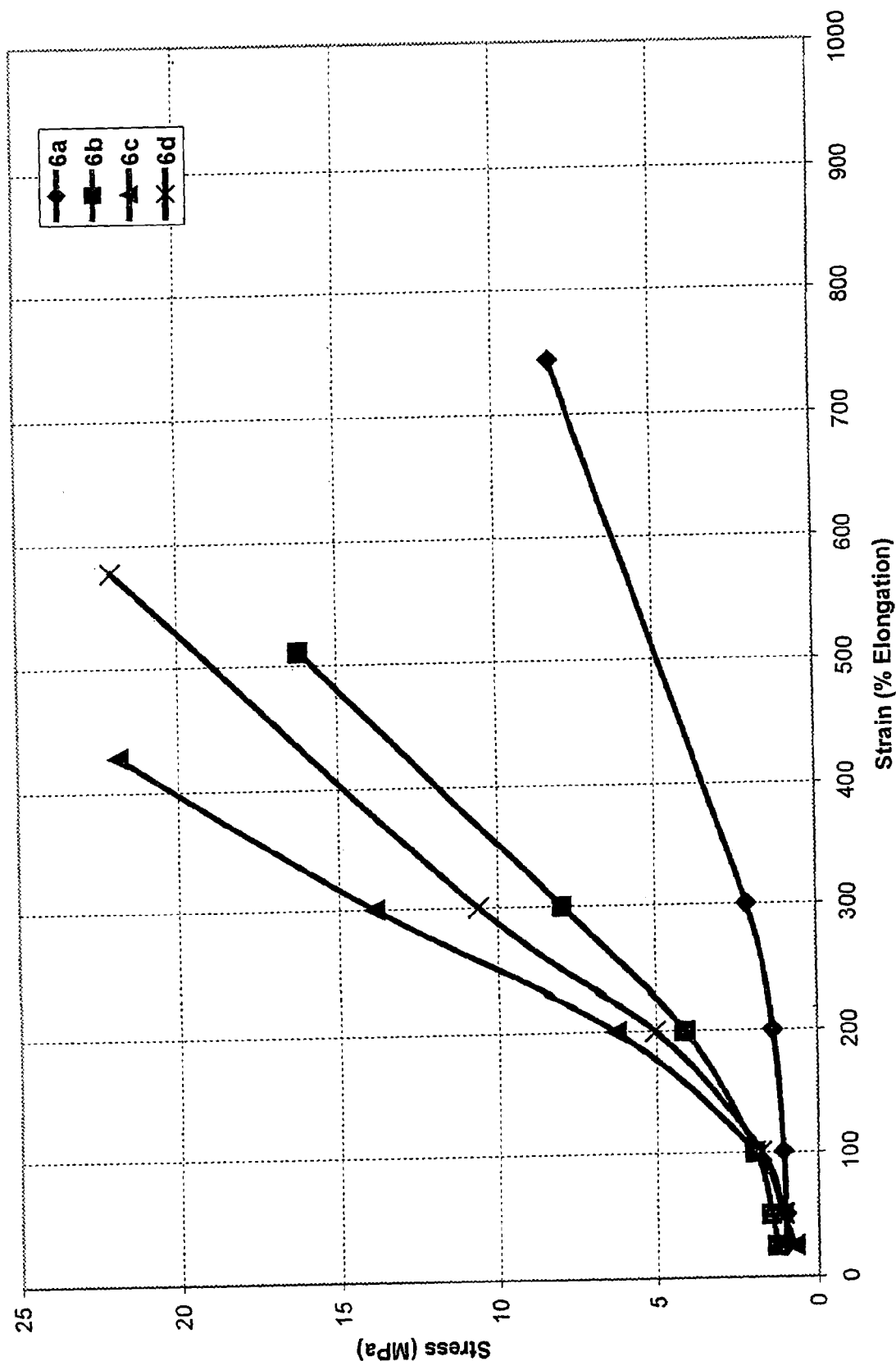
FIG. 7 illustrates an improvement in reinforcement for compounds that contain protein-modified silica (HSPC 25).
Figure 8:
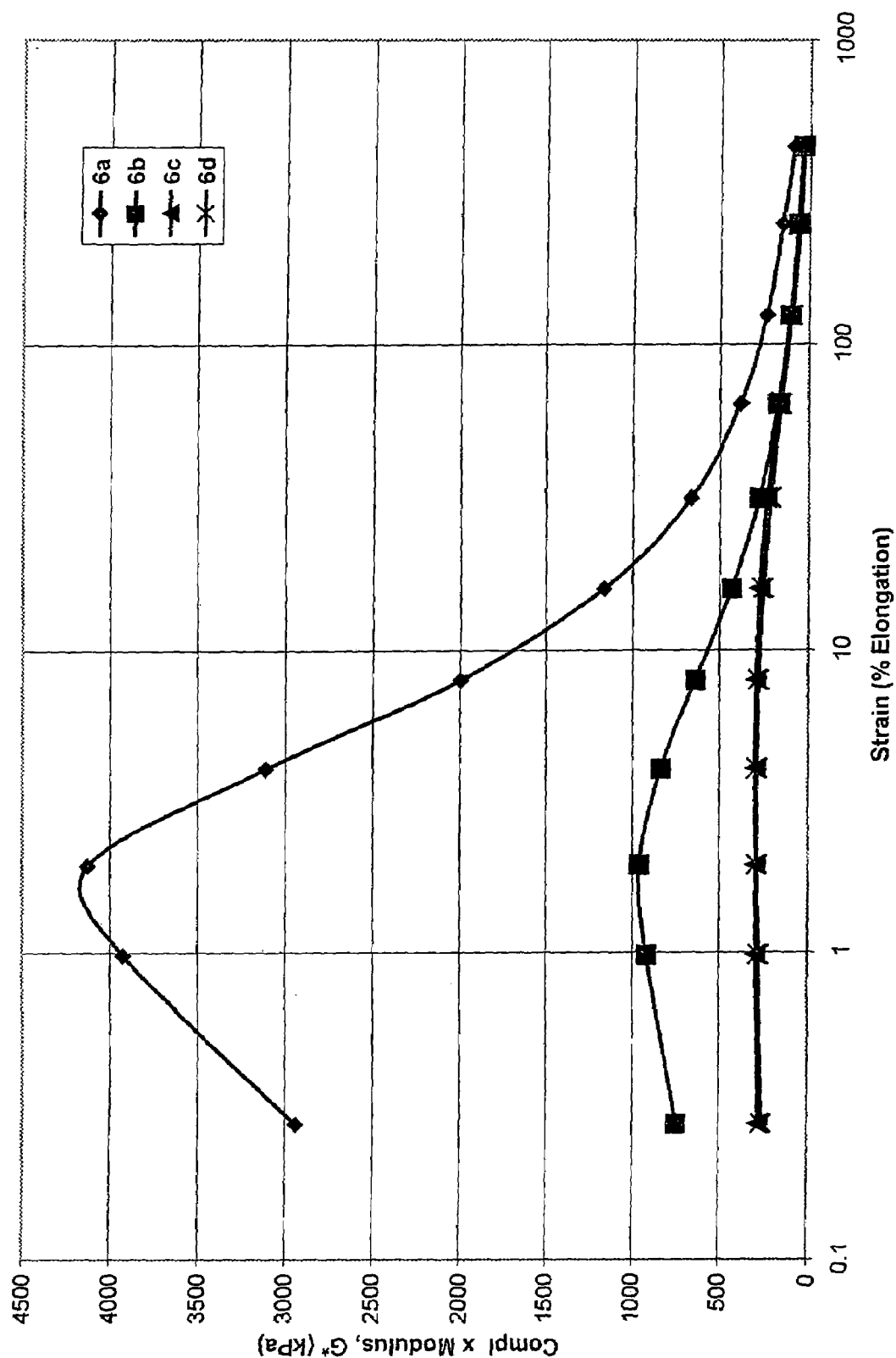
FIG. 8 illustrates an improved compatibility between protein-modified silica (HSPC 25) and bromobutyl rubber.
Figure 9:
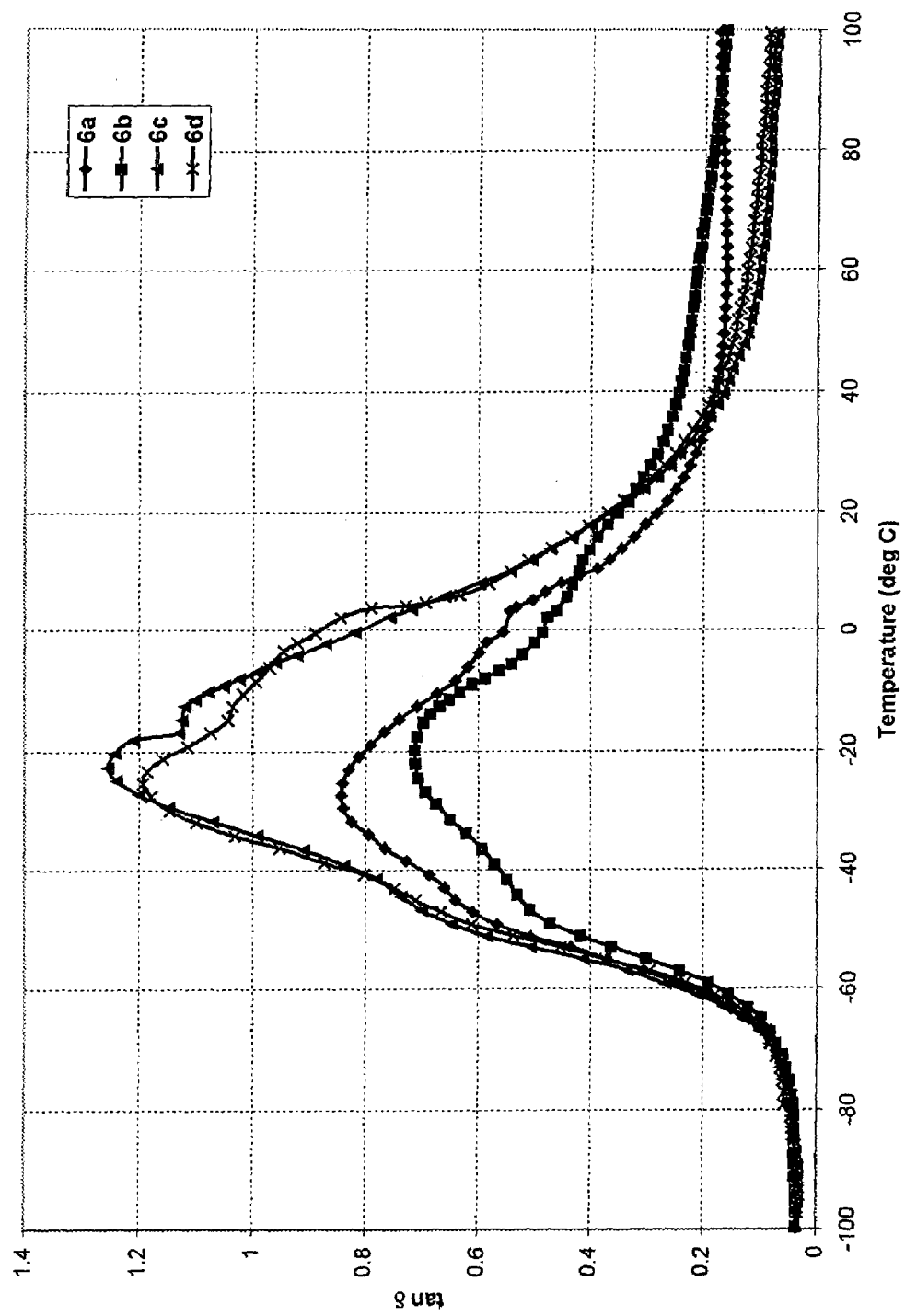
FIG. 9 illustrates the improved dynamic properties of vulcanizates containing protein-modified silica (HSPC 25).

As can be seen from the data presented in Table 6 and depicted in FIGS. 7–9, the use of HSPC025 imparts enhanced physical and dynamic properties to the final vulcanizates as compared to the HiSil® 233-based analogues. Furthermore, the reduced levels of ProCote 5000 present in HSPC025 (c.f. HSPC100 and HSPC025), allows for the attainment of superior M300/M100 values and higher levels of DIN abrasion resistance while still imparting improved physical and dynamic properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing compositions comprising metal free halobutyl elastomers and mineral fillers comprising the step of admixing at least one metal free halobutyl elastomer with at least one surface modified mineral filler, wherein the surface of said mineral filler has been modified with at least one organic compound containing at least one basic nitrogen-containing group and at least one hydroxyl group prior to admixing with the elastomer, wherein the organic compound is selected from the group consisting of proteins, aspartic acid, 6-aminocaproic acid, diethanolamine and triethanolamine.

2. A process according to claim 1, wherein the basic nitrogen-containing group is an amino group.

3. A process according to claim 1 wherein the hydroxyl group is a carboxylic acid group.

4. A process according to claim 1 wherein the organic compound is a protein.

5. A process according to claim 1, wherein the filler is silica.

6. A process according to claim 1, wherein the filled halobutyl elastomer further is admixed with another elastomer or elastomeric compound and subsequently subjected to curing.

* * * * *